US009007405B1

(12) United States Patent
Eldar et al.

(10) Patent No.: US 9,007,405 B1
(45) Date of Patent: Apr. 14, 2015

(54) COLUMN ZOOM

(75) Inventors: Shalom Dov Eldar, Palo Alto, CA (US); Parmanand P. Kejriwal, Saratoga, CA (US)

(73) Assignee: Amazon Technologies, Inc., Reno, NV (US)

( * ) Notice: Subject to any disclaimer, the term of this patent is extended or adjusted under 35 U.S.C. 154(b) by 796 days.

(21) Appl. No.: 13/073,909

(22) Filed: Mar. 28, 2011

(51) Int. Cl.
  *G09G 5/00* (2006.01)
  *G09G 5/02* (2006.01)

(52) U.S. Cl.
  CPC ........................................ *G09G 5/02* (2013.01)

(58) Field of Classification Search
  CPC ................... G06F 2203/04806; G06T 11/60
  USPC .......................................... 345/666; 715/243
  See application file for complete search history.

(56) References Cited

U.S. PATENT DOCUMENTS

| | | | | |
|---|---|---|---|---|
| 5,751,450 | A * | 5/1998 | Robinson | 358/504 |
| 7,574,486 | B1 * | 8/2009 | Cheng et al. | 709/219 |
| 2003/0014445 | A1 * | 1/2003 | Formanek et al. | 707/526 |
| 2004/0037470 | A1 * | 2/2004 | Simske | 382/229 |
| 2005/0131887 | A1 * | 6/2005 | Rohrabaugh et al. | 707/3 |
| 2007/0204220 | A1 * | 8/2007 | Petrov Nickolov et al. | 715/530 |
| 2007/0234203 | A1 * | 10/2007 | Shagam et al. | 715/517 |
| 2010/0331043 | A1 * | 12/2010 | Chapman et al. | 455/556.1 |
| 2011/0107206 | A1 * | 5/2011 | Walsh et al. | 715/256 |
| 2011/0255791 | A1 * | 10/2011 | Abdo et al. | 382/199 |
| 2012/0196260 | A1 * | 8/2012 | Nhiayi | 434/317 |
| 2012/0221969 | A1 * | 8/2012 | Sansen et al. | 715/784 |

OTHER PUBLICATIONS

"iPhone Apple Mobile Safari Internet Browser Tips", Available at <http://www.moorewallpaper.com/apple-women-iPhone-3gs-apps-review-applications-safari-internet-browser-tips.htm>, Retrieved on Mar. 28, 2011. 3 Pages.
"iPhone Safari", Available at <http://www.iphone-tips-and-advice.com/iphone-safari.html>, Retrieved on Mar. 28, 2011, 7 Pages.
Perenson, "Mobile Web Browsers: Hands-On with Firefox 4 for Mobile", Available at <http://www.pcworld.com/article/223260/mobile_web_browsers_handson_with_firefox_4_for_mobile.html>, PCWorld, Mar. 24, 2011, 3 Pages.

* cited by examiner

*Primary Examiner* — Maurice L McDowell, Jr.
*Assistant Examiner* — Kyle Zhai
(74) *Attorney, Agent, or Firm* — Lee & Hayes, PLLC

(57) ABSTRACT

An image-based document may include text that is presented in a multicolumn format that is not structured or associated with metadata of the document. A zoom manager may analyze the image-based document, identify a presence and location of a column of text, and then enable automatic zooming-in on the column of text to fill a display space without further interaction by a user. In various aspects, the zoom manager may order the columns to enable the user to continuously scroll from column to column while navigating the document in a column-viewing (zoomed-in) mode. The zoom manager may also selectively maintain or remove information or objects from the columns while in the column-viewing mode, such as images, headers, footers, page numbers, or other types of information or objects.

25 Claims, 9 Drawing Sheets

COLUMN ZOOM

BACKGROUND

Computing devices have become ubiquitous in almost every environment. Mobile telephones, laptop computers, and tablet computers are commonly used for work and pleasure and often accompany people in many daily activities. To increase portability, many devices include integrated displays that are often relatively small compared to stand-alone displays, such as computer monitors. The relatively small size of these integrated displays encourages efficient use of display space by applications run on the device to maximize access to information by a user.

As more and more users turn to computer networks such as the Internet and particularly the World Wide Web (hereinafter, the "Web") for information, content providers are increasingly converting traditional content (e.g., printed materials such as books, magazines, newspapers, newsletters, manuals, guides, references, articles, reports, documents, and the like) to electronic form. However, because differences exist between the display of traditional content in printed form and the display of such content in electronic form, techniques for displaying content in electronic form continually evolve.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

To better accommodate users of computing devices (e.g., mobile devices) that include relatively small display screens, user interfaces may be implemented that enable simplified navigation within a document. As discussed herein, a computing device may process and display an image-based document (e.g., a joint photographic experts groups (JPEG) document, a portable document format (PDF) document, etc.) that includes no formatting metadata or relatively small amounts of formatting metadata. The image-based document may include text that is presented in a multicolumn format that is not structured or associated with metadata of the document. For example, unlike text that is formatted in columns using a table in Hypertext Markup Language (HTML) documents, the image based document does not define the columns of text within a table or other formatting structure.

In various embodiments, a zoom manager may analyze the image-based document, identify a presence and location of a column of text, and then enable automatic zooming-in on the column of text to fill a display space without further interaction by a user. This may allow a user to quickly zoom-in on a column by tapping on the column via a touch screen display or otherwise selecting the column.

In various embodiments, the zoom manager may order the columns to enable the user to continuously scroll from column to column while navigating the document in a column-viewing (zoomed-in) mode. Thus, after a user zooms in on a first column and then scrolls to the end of the column, a second column may be presented at the end of the first column to enable continuous content deliver without additional navigation commands, such as a zooming out command, a panning command, and so forth. The zoom manager may also selectively maintain or remove information or objects from the columns while in the column-viewing mode, such as images, headers, footers, page numbers, or other types of information or objects.

The techniques and systems described herein may be implemented in a number of ways. Example implementations are provided below with reference to the following figures.

Illustrative Computing Device

Figure 1:
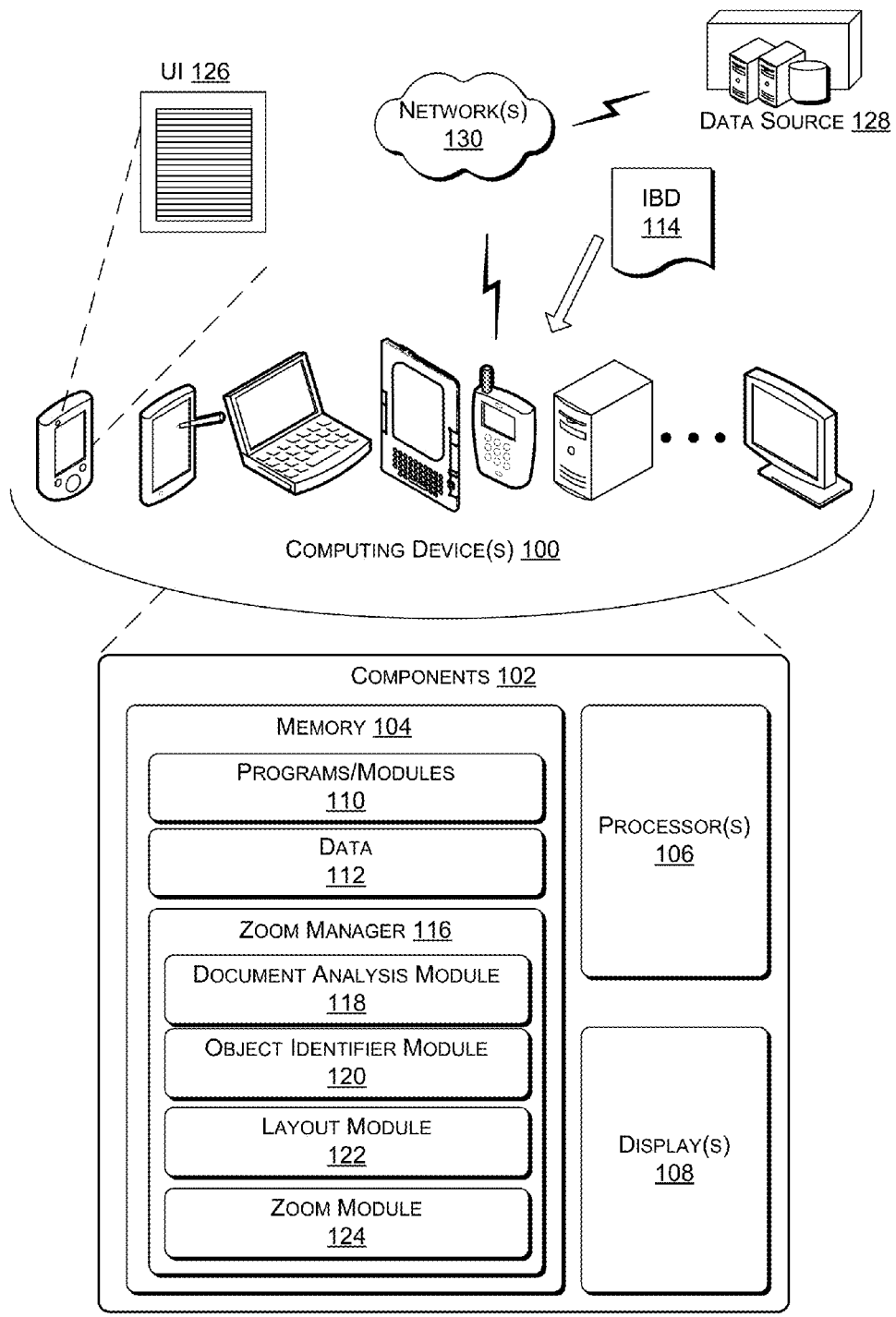
FIG. 1 is a schematic diagram of illustrative computing devices that enable selecting and zooming-in on a column of text to fill a display space.

FIG. 1 shows illustrative computing devices 100 (or simply "devices") that enable selecting and zooming-in on a selected column of text to fill a display space. A non-exhaustive list of the devices 100 may include a notebook computer, a music player, a mobile telephone (including smartphones), a tablet computer, an electronic book (eBook) reader device, server(s), and a television, and so forth. However, many other types of devices may be configured to perform the operations as discussed herein.

As illustrated, the devices 100 include various components 102. In some embodiments, the components 102 include memory 104 and one or more processor(s) 106. The processor(s) 106 interact with the memory 104 to execute instructions and facilitate operation of the device 100. The components 102 may also include a display 108, which may be an integrated display, or in some instances, an external display. In various embodiments, the display 108 may be a touch screen display that enables a user to interact with software through use of selections (gestures), which may include various touch-interactions by the user with the display 108.

The memory 104 may include volatile memory (such as RAM), nonvolatile memory, removable memory, and/or non-removable memory, implemented in any method or technology for storage of information, such as computer-readable instructions, data structures, program modules, or other data. Also, the processor(s) 106 may include onboard memory in addition to or instead of the memory 104. Some examples of storage media that may be included in the memory 104 and/or processor(s) 106 include, but are not limited to, random access memory (RAM), read only memory (ROM), electrically erasable programmable read only memory (EEPROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by the devices 100. Any such computer-readable media may be part of the devices 100.

The memory 104, meanwhile, may include software programs or other executable modules 110 that may be executed by the processor(s) 106. Examples of such programs or modules include indexing modules for indexing data, reader programs, control modules (e.g., power management), network connection software, an operating system, sensor algorithms, and so forth. The memory 104 may also be used to store data 112, such as data files, audio and/or video media, electronic books (eBooks), or the like.

In accordance with various embodiments, the data 112 may store an image-based document (IBD) 114. The IBD 114 may be an image including an image of any of a number of formats, such as the Windows® bitmap (BMP), the graphic interchange format (GIF), the joint photographic experts groups (JPEG) format, the tagged image file format (TIFF), other Raster formats, vector formats, or stereo formats. Also, the IBD 114 may include still images captured, for example, by a camera or image frames from one or more videos, scanned images, or images from other sources. In some instances, the IBD 114 may be a portable text-based document, such as a portable document format (PDF) document. The IBD may be used to store information, such as one or more potions of a book, a magazine, an advertisement, a newspaper, a newsletter, a manual, a guide, a reference, an article, a report, and/or any other work for visually transmitting information. For example, the IBD 114 may include an article of a magazine that is reproduced in digital form by use of an optical scanner.

In accordance with various embodiments, the memory 104 may include a zoom manager 116 that manages processing, navigation, and/or other tasks related to the IBD 114. The zoom manager 116 may include several modules to perform these tasks. The modules may include a document analysis module 118, an object identifier module 120, a layout module 122, and a zoom module 124.

The document analysis module 118 may analyze the IBD 114 to identify white spaces, columns within multicolumn text, headers, footers, images, and/or other objects in the IBD 114. For example, the document analysis module 118 may scan the IBD 114 to identify locations of white spaces and non-white spaces. As discussed herein, the white-space is a predominant background used in the IBD 114, which may consist of colors other than white, and in some instances, background imagery. Similarly, the non-white spaces may include markings that are distinguishable from the background.

The object identifier module 120 may identify and categorize objects in the non-white spaces. In some embodiments, the object identifier module 120 may employ limited use of optical character recognition (OCR) to determine characteristics of the non-white space. The non-white spaces may be categorized as columns of text, headers, footers, images, artifacts, or other types of objects. Each type of object may then be processed accordingly by the layout module 122 and the zoom module 124 as discussed below.

In various embodiments, the layout module 122 may layout the objects for presentation by the zoom module 124. The layout module may designate some objects for removal when the column is in a column-viewing mode (zoomed-in by the zoom module 124). For example, images, headers, footers, page numbers, or a combination thereof may be removed by the layout module 122 such that the presentation of the column in the column-viewing mode may not include some of or all of these objects. In some embodiments, the layout module 122 may replace an object with a link to the object, which may enable access to the object without showing the entire object in the column-viewing mode.

The layout module 122 may also detect a flow of the text in a column using information from the object identifier module 120 and/or by performing additional OCR. For example, the layout module 122 may reflow text to layout the text to fill a location where an image was removed from the column, to resize the text of the column, or for other reasons. In some embodiments, the layout module 122 may associate the columns in a multicolumn to create an ordering of the columns based on rules of a detected language or other rules.

The zoom module 124 may identify a column that is selected by a user. The zoom module 124 may highlight the column, such as by generating a border around the column in response to the selection. The zoom module 124 may then zoom-in on the column in response to another user selection or in response to the first user selection, which may result in the column automatically filling a display space without further action by the user (e.g., no additional panning/zooming). In various embodiments, the zoom module 124 may enable the user to scroll through the selected column in the column-viewing mode, and then present the next column (based on the ordering by the layout module 122), to enable the user to navigate to the next column without performing additional panning or zooming commands. From the user's perspective, this feature may appear to convert the multiple columns into a single longer column that includes all of the columns placed one after another in their respective order. In some embodiments, the zoom manager 124 may enable a user to perform additional zoom operations once in the column-viewing mode to increase the size of text or for other reasons.

Various processes, instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processor(s) 106, as hardware, and/or as firmware. Typically, the functionality of the program modules may be combined or distributed as desired in various embodiments. An implementation of these modules and techniques may be stored on or transmitted across some form of computer-readable media.

As shown in FIG. 1, the device(s) may display a user interface (UI) 126 using the display 108. The UI 126 may be configured for user interaction using traditional input devices such as keyboards, mice, touch pads and the like; or by non-traditional input devices such as touch screens, voice commands, and motion detection that may not require dedicated controllers or buttons on the housing of the device 100.

In some embodiments, the device 100 may be in communication with a data source 128 via a network 130, such as a wired or wireless network. The data source 128 may provide information, such as the IBD 114 that may be processed, organized, or otherwise manipulated by the zoom manager 116 that is described above for presentation in the UI 126. The zoom manager 116 may be used to enable a user to navigate, select, access, or otherwise interact with the IBD 114 from the data source 122 as well as from local storage on the device (i.e., the data 112).

The operations of the zoom manager 116 may be performed in whole or in part on a remote server. For example, the modules of the zoom manager 116 may be implemented across one or more servers in a cloud computing environment, they may be implemented on a local user device, or they may be implemented using a combination of both. The following discussion does not limit the implementation of the modules of the zoom manager 116 to any particular device or environment.

Illustrative Image-Based Document Processing

Figure 2:
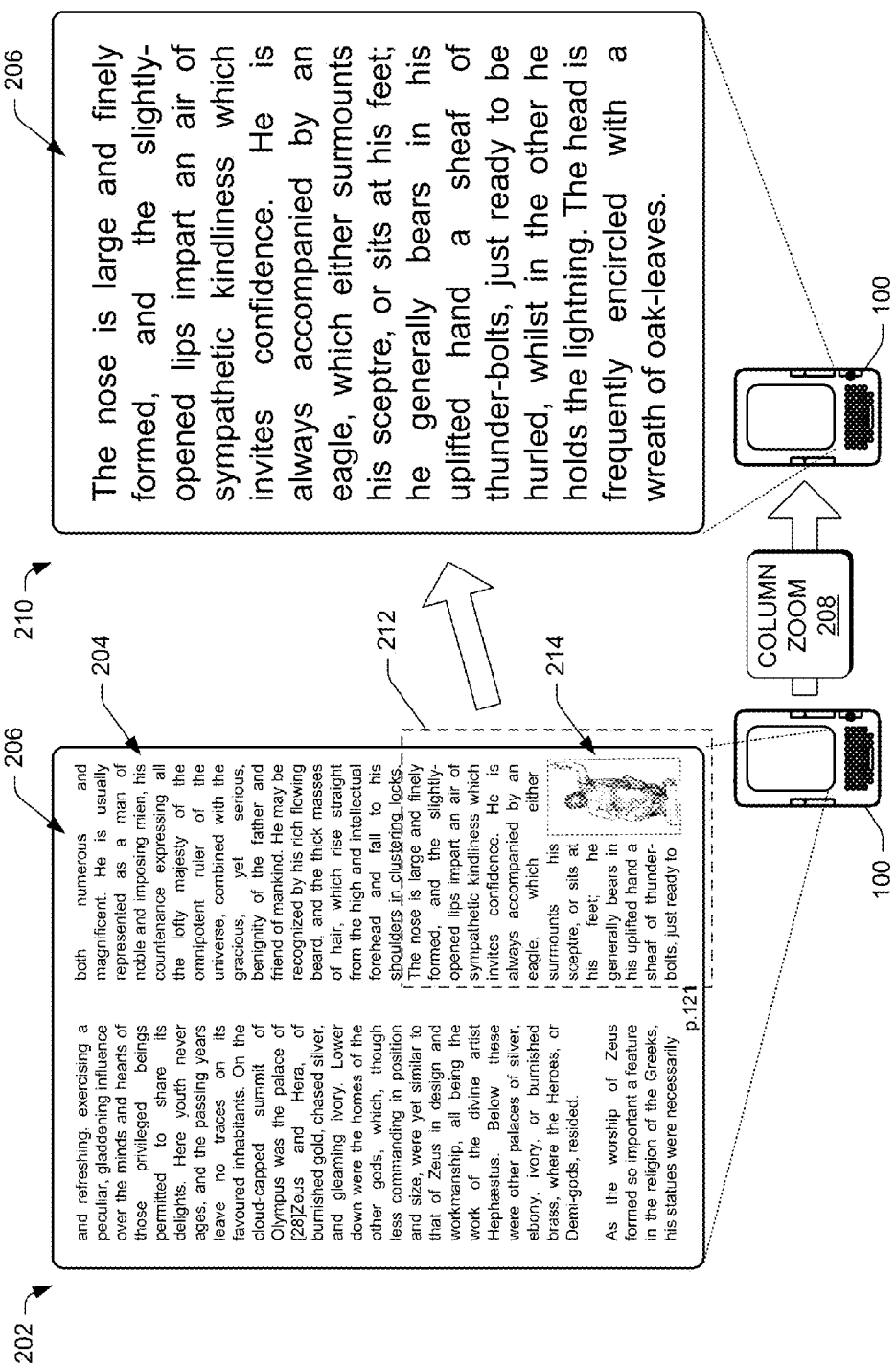
FIG. 2 is a schematic diagram showing illustrative zooming-in on a selected column from an image-based document to fill the display space.

FIG. 2 shows illustrative zooming-in on a selected column from an image-based document (e.g., the IBD 114) to fill a display space of the device 100. Prior to the zooming-in, the device 100 may show a non-zoomed presentation 202 of a portion of the IBD 114 that includes multiple columns of text. In various embodiments, the non-zoomed-in presentation may be a presentation of text that does not include text associated with columns using formatting controls such as a table designation.

A user may desire to zoom-in on one of the columns visible in the non-zoomed-in presentation 202. For example, the user may designate or select a column 204 to be zoomed-in to fill a display space 206 of the electronic device 100. The display space 206 may be determined by a viewable area of the display 108 or an application within the display. The display space 206 may not include any space used for toolbars, borders, or other types of information, which may be used by an operating system, application, or other controls of the electronic device 100.

After the user designates the column 204, the zoom manager 116 may perform a column zoom 208, which may result in a zoomed-in a presentation 210 of a portion of the selected column that approximately spans a width of the display space 206. For example, the column 204 may be zoomed-in to such that the column fills the display space leaving only a small margin between the text in the column and the edge of the display space. The zoom manager 116 may select a zoom-in expansion factor that causes the zoomed-in presentation 210 to approximately span or fill the display space 206 while centering or aligning the column within the display space. This may enable the user to view the selected column without a need to perform other zooming or panning operations.

The user may then scroll through the selected column (scroll up/down) to view the content of the column. The zoomed-in presentation 210 may represent a portion 212 of the selected column, which may allow the zoomed-in portion 210 to maintain a same proportion of the selected column after the zooming-in process.

In some embodiments, the zoom manager 116 may remove one or more objects from the selected column when the column is presented in the zoomed-in presentation 210. For example, an image 214 may be identified by the object identifier module 120 and removed by the layout module 122 prior to rendering of the zoomed-in presentation by the electronic device 100. In some instances, the text in zoomed-in presentation 210 may be reflowed to move words to a previous or next line to fill a maximum amount of space on each line and thus make efficient use of the display space 206.

In some embodiments, the zoom manager 116 may create the zoomed-in presentation 210 without reflowing text, modifying or removing images, or performing other operations other than applying an expansion factor to zoom-in on the selected column. This may allow the zoom manager 116 to perform the zooming-in operation without modifying the IBD 114 or creating a new document with reflowed text, etc. In various embodiments, the zoom manager 116 may reflow text, remove objects, or perform other changes to content of the IBD 114 that result in changes to the IBD 114 or creation/modification of a new document or file, possibly using cached data.

Figure 3:
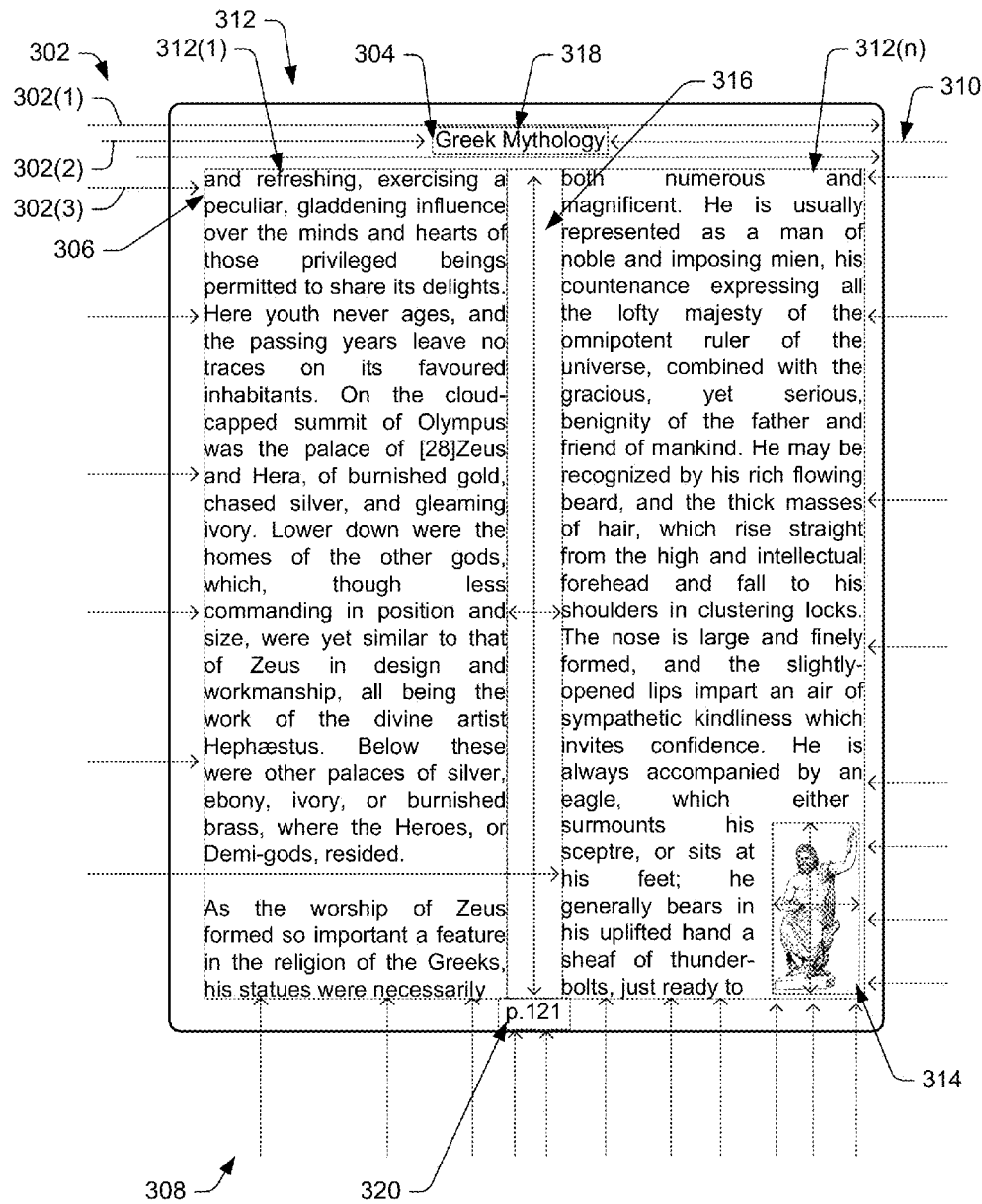
FIG. 3 is a schematic diagram showing an illustrative analysis of the image-based document to identify columns and other features in the document.

FIG. 3 is a schematic diagram showing an illustrative analysis of the IBD 114 to identify columns and other features in the document. As shown in FIG. 3, the document analysis module 118 may attempt to ascertain distinguishing edges of objects, text, or other content within the IBD 114 by making repeated passes across lines of the IBD 114 from various directions. For example, the document analysis module 118 may make repeated processing passes 302 across the IBD 114.

In various embodiments, the document analysis module 118 may make the processing passes 302 for each line of pixels that make up the digital image 200. Thus, the arrows that represent the processing passes 302 are merely illustrative, and are not intended to represent every processing pass made by the document analysis module 118. In some embodiments, the processing passes 302 may skip some lines to improve processing speed. The document analysis module 118 may determine that content is reached when a pixel has a color value that is different from the color value of the background of the IBD 114. In some embodiments, the color value of the background may be the predominate color of the IBD 114 (i.e., a most prevalent color of the IBD 114). In other embodiments, the color value of the background may be the color value of one or more corner regions as these regions are likely to be representative of the background rather than containing content (e.g., text, objects, etc.).

In the example shown in FIG. 3, the document analysis module 118 may make a processing pass 302(1) across the digital image 200 without detecting a pixel having color value that is different from the color value of the background of the digital image. Thus, the document analysis module 118 may disregard any horizontal distance value obtained during this processing pass (and other processing passes with similar results) as the horizontal distance covered during the scan is equal to the total width of the IBD 114. Subsequently, the document analysis module 118 may make a processing pass 302(2). During the processing pass 302(2), the document analysis module 118 may detect a color value change at a position 304 as the processing pass reaches the letter "G" in the word "Greek". At this point, the document analysis module 118 may make a notation regarding a first horizontal distance between the position 304 and the left edge of the IBD 114. The document analysis module 118 may proceed with further processing passes.

At processing pass 302(3), the document analysis module 118 may detect a color value change at a position 306 as the processing pass 302(3) reaches the letter "a" in the word "and". Likewise, the document analysis module 118 may make a notation regarding a second horizontal distance between the position 306 and the left edge of the IBD 114. In this manner, the document analysis module 118 may make a plurality of processing passes across the IBD 114, noting the horizontal distance between the left edge and any detected content as indicated by a color value change.

Once the document analysis module 118 has made all the processing passes over the IBD 114 in a first direction, the document analysis module may perform other processing passes from other directions, such as bottom-to-top processing paths 308, right-to-left processing paths 310, and so forth to identify other edges and locations of color value changes that represent a location of an object, such as a column 312, an image 314, a column divider 316, a heading 318, a page number 320, or other objects (footers, subheadings, etc.).

In some embodiments, the document analysis module 118 may continue the processing paths after detecting a first color value change to identify a second color value change, such as repeated instances of the background color that may be representative of the column divider 316. The continued processing paths may be used to store additional data that may indicate that the color value change is indicative of an image, of text, or other types of objects in the IBD 114.

The object identifier module 120 may then identify and label the objects in the IBD 114 based on the analysis performed by the document analysis module 118. In some embodiments, the object identifier module 120 may employ selective OCR to determine whether an object within a border identified by the processing paths includes text, to identify a page number, or for other reasons. Thus, the object identifier module 120, working in conjunction with the document analysis module 118, may positively identify and label the columns 312 as a first column 312(1) to a last column 312(n). The object identifier module 120 may also positively identify and label the image 314, the column divider 316, the heading 318, the page number 320, and/or other objects (footers, subheadings, etc.) in the IBD 114.

The aforementioned techniques include a set of illustrative techniques to analyze the IBD 114 and identify and label objects in the IBD. However other known techniques may be employed to analyze the IBD 114 and accomplish similar results.

Figure 4:
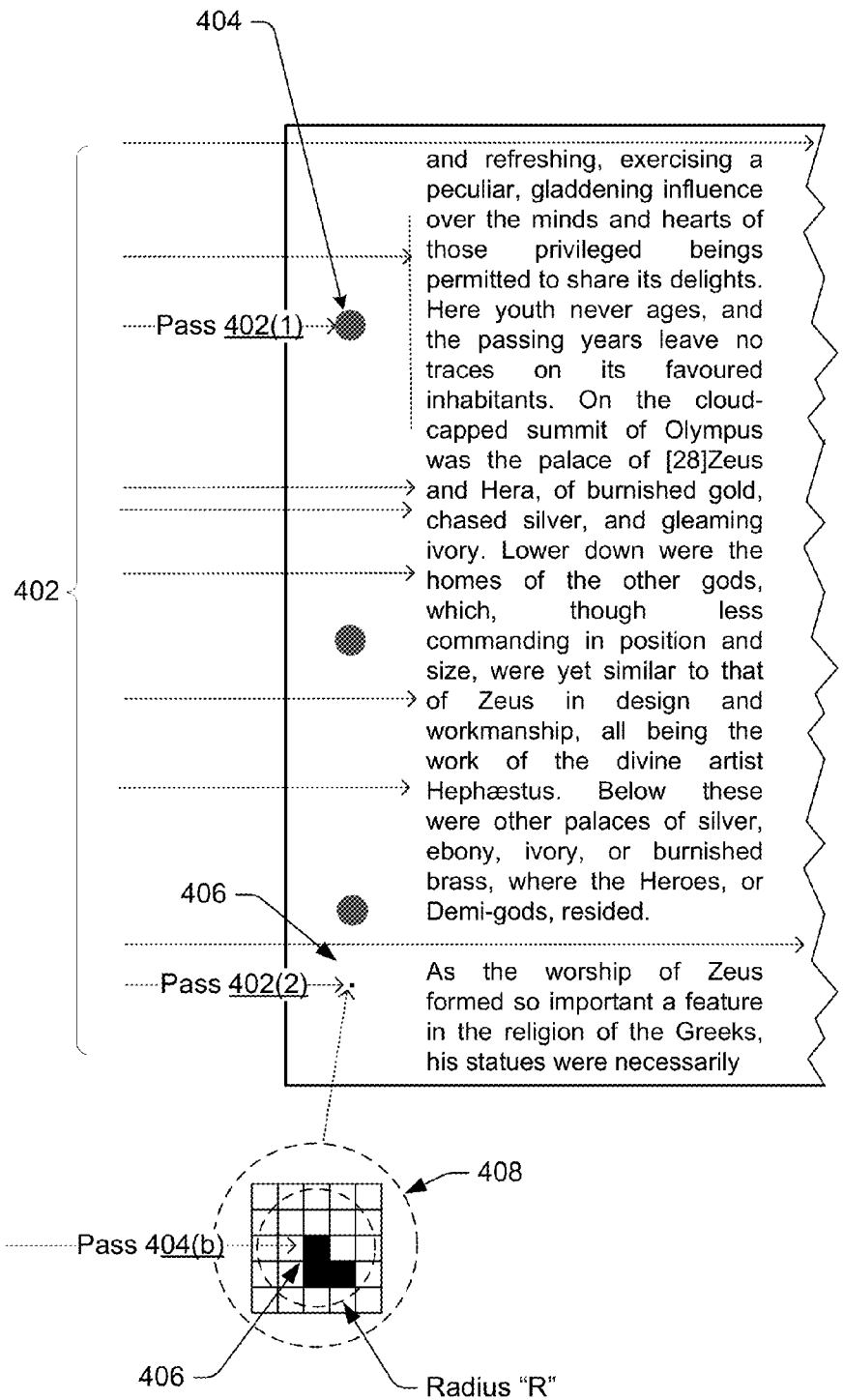
FIG. 4 is a schematic diagram showing illustrative detection and elimination of artifacts from the document during the processing of the document.

FIG. 4 is a schematic diagram showing illustrative detection and removal of artifacts from the document during the processing of the IBD 114. As discussed above, the document analysis module 118 may make repeated processing passes 402 along lines of the IBD 114 to detect pixels having a color different than a back ground color. In accordance with some embodiments, the object identifier module 120 may perform a validation process to determine whether the pixel represents an artifact or represents an object. If the pixel represents an artifact, then the artifact may be categorized (labeled), ignored or removed rather than falsely categorized as another type of object (e.g., an image, text such as a period, comma, etc.). The following discussion first discusses analysis of pixels to identify artifacts and then discusses analysis of pixels as other objects, such as images, columns of text, and so forth.

Illustrative Artifact Detection

In some embodiments, the object identifier module 120 may perform the validation of the non-background color pixel based on the similarity in color between the non-background color pixel and a dominate non-background color of the digital image. Thus, in such embodiments, the object identifier module 120 may ascertain the most common non-background color present in the IBD, or the "dominate color value". The dominant color may be a variation of the color black (e.g., black or shades of grey) in a typical black and white document; however, the dominant color may be other colors or shades.

In some embodiments, the document analysis module 118 may make a processing pass 402(1) that reaches a pixel 404 (or group of pixels) that has a candidate color value that is a non-background color. The object analysis module 120 may determine whether the candidate color value of the pixel 404 (or group of pixels) matches the dominate color value. If the candidate color value matches the dominate color value, then the object analysis module 120 may determine that the pixel 404 is not an artifact and may proceed to perform additional texts to identify the object. However, if the object analysis module 120 determines that the candidate color value of the pixel 404 does not match the dominate color value, the object analysis module 120 may determine that the pixel 404 is part of an artifact and should be categorized as such, removed, or ignored. Accordingly, the document analysis module 118 may proceed to the next pixel or group of pixels and continue the analysis.

In various embodiments, the object identifier module 120 may accept a pixel as part of the content if its candidate color value is within a predetermined deviation range from the dominate color value. In at least one embodiment, the predetermined deviation range may be up to predetermined percentage hue deviation. Thus, if the candidate color value of a pixel, such as the pixel 404, is a grayscale color whose color value is within the predetermined percentage hue deviation from the dominate color value, the object identifier module 120 may determine that the pixel 404 (or group of pixels) is part of the content that is on the IBD 114. It will be appreciated that the predetermined percentage hue deviation may be any range that serves to accommodate some natural variability with respect to the color of the content yet effectively distinguishes the content of the IBD 114 from artifacts.

In accordance with some embodiments, the object identifier module 120 may perform a density check for each pixel that has a non-background color to determine whether the pixel or pixels are artifacts or other objects. For example, as shown in FIG. 4, the document analysis module 118 may make a processing pass 402(2) that reaches a pixel 406 that has a non-background color (as shown in a magnified view 408). Having reached pixel 406, the object identifier module 120 may examine the color values of pixels that fall within a predetermined proximity, such as within a radius "R" of the pixel 406. For example, the predetermined radius "R" may be two pixels in at least one embodiment. However, in other embodiments, any number of pixels may serve as the predetermined radius.

In such embodiments, the object identifier module 120 may determine that the pixel 406 is part of an artifact if the surrounding pixels do not include a predetermined percentage/number of non-background color pixels having the same color as the pixel 406. For example, in at least one embodiment, the object identifier module 120 may determine the pixel 406 is part of an artifact if the surrounding pixels do not include at least 50% identically colored pixels. Nevertheless, the predetermined percentage/number of non-background color pixels (e.g., surrounding pixels) having the same color as the pixel being examined (e.g., pixel 406) may vary in other embodiments.

In various embodiments, the margin detection module 124 may only determine that a pixel is part of the content of the digital image 200 if the pixel passes both tests. In other words, the pixel is deemed to be part of the content if it (1) has a candidate color value that matches or is within a predetermined deviation of a dominate color value; and (2) is surrounded by a predetermined percentage/number of identically colored pixels.

In addition to the color validation and the density check test described above, the object identifier module 120 may include other heuristics for detecting artifacts. In at least some embodiments, after performing a predetermined number of left-to-right processing passes on the IBD 114, the object identifier module 120 may determine that a predetermined threshold percentage of the notations from the processing passes indicate that the distance between the content and an edge of the IBD 114 (e.g., the left edge, etc.) is a specific distance (e.g., number of pixels, etc.). Accordingly, for the remaining left-to-right processing passes, the object identifier module 120 may determine that any pixel with a non-background color that is less than the specific distance from the edge likely comprises an artifact.

In some embodiments, the object identifier module 120 may implement such additional heuristics for detecting artifacts in combination with the color validation test and/or the density check test as described above. In other embodiments, the object identifier module 120 may use such heuristics in place of one or both of the color validation test and the density check test for various margins.

Illustrative Character-Based Column Detection

In some embodiments, the IBD 114 may include embedded text characters that are identified during generation of the document or during a pre-processing of the document. The text characters may include bounding boxes that identify the location and bounds of the character within a given space. In some instances, the bounding boxes may include coordinate information.

In various embodiments, the character-based column detection may initially receive an array of characters with bounding box coordinates. The layout module 122 may use OCR to determine a language of the text, which may then be used to group the characters into words based on the determined language.

The layout module 122 may then determine a direction of the text based on the language and layout. The text direction may be a direction of the text across a line of the text (multiple words) and between the columns of the multi-columns of text in the IBD 114.

The layout module 122 may create rectangles of words using the characters. The rectangles may be reordered to enable detection of white spaces in the IBD 114. For example, when the text in a column is left-to-right text, the rectangles may be sorted by their left x-coordinate. This may enable location and detection of vertical white spaces which are evidence of a division between columns in a multi-column presentation of text. In some embodiments, heuristics may be used to calibrate the detection to avoid false positive identification of white spaces between words as being spaces between columns. When the columns are presented as horizontal columns (e.g., 90-degree rotation of IBD), similar processing may also be used that adjusts for the rotation.

The layout module 122 may create an array of column rectangles, which are bounds (rectangles) of the column between the white spaces that were detected above. For example, each column rectangle may represent a column of text. The words may then be sorted into the different column rectangles. The words may be reordered into lines within the column rectangle based on their top y-coordinate (in horizontal text), and then reordered in an internal order within each line based on the detected language. In addition, the column order may be determined based on the detected language.

Illustrative Object Categorization

The object identifier module 120 may categorize other non-background colored groupings of pixels as a type of object, such as columns of text, images, headers, footers, titles, pages numbers, or other types of objects. In various embodiments, the object identifier module 120 may perform an analysis based on the information from the document analysis module 118, which may identify the borders or transition points of the groups of pixels that define objects. For example, the object identifier module 120 may determine a border for a column of text. The object identifier module 120 may then analyze the pixels within the border to determine that the pixels include letters (e.g., via OCR processing, etc.) and then label or categorize the group of pixels as a column.

In various embodiments, the object identifier module 120 may use extraneous data to make inferences about a group of pixels. For example, the object identifier module 120 may identify a column divider 316 (i.e., white space between columns), which may have a border characterized by a narrow width and pixels having the background color. The object identifier module 120 may determine that the column divider 316 is located between two larger vertical groups of pixels that include a non-background color, thus enabling positive classification of the column divider 316. The object identifier module 120 may then make use of the known column divider 316 to identify the columns 312.

The object identifier module 120 may classify other groups of pixels having non-background colors as objects based on a known location of the columns 312 and the column divider 316, and through use of other analysis processes such as OCR. For example, a group of pixels located below a column may be presumed to be a footer or a page number, which may be positively classified through use of OCR. Similarly, a group of pixels located above the column may be presumed as a header.

In some embodiments, the object identifier module 120 may classify a group of pixels as being an image using techniques similar to those discussed above for identifying artifacts. The object identifier module 120 may designate a group of pixels as an image (or other type of non-text object) based on a size of the group of pixels as compared to a threshold quantity, a shape of the group of pixels (e.g., rectangular, etc.) and/or based on a location of the group of objects. For example, the object identifier module 120 may determine whether a group of pixels are located in alignment with one of the columns 312, centered on a page, or otherwise aligned on a page with another object. The object identifier module 120 may then categorize this object as an image (or other non-text object) when a prerequisite alignment is confirmed. Further, the object identifier module 120 may sample a portion of the group of pixels using OCR to determine whether characters are present, which may confirm that the group of pixels are part of an image or, instead, are part of a textual object, such as a header, footer, etc.

The operations of the document analysis module 118 and the object identifier module 120 are illustrative of possible techniques to identify and categorize groups of pixels as objects such as columns of text, images, headers, footers, and so forth. However, other known techniques may be used to accomplish the same results without departing from the spirit of this disclosure.

Additional Processing

Figure 5:
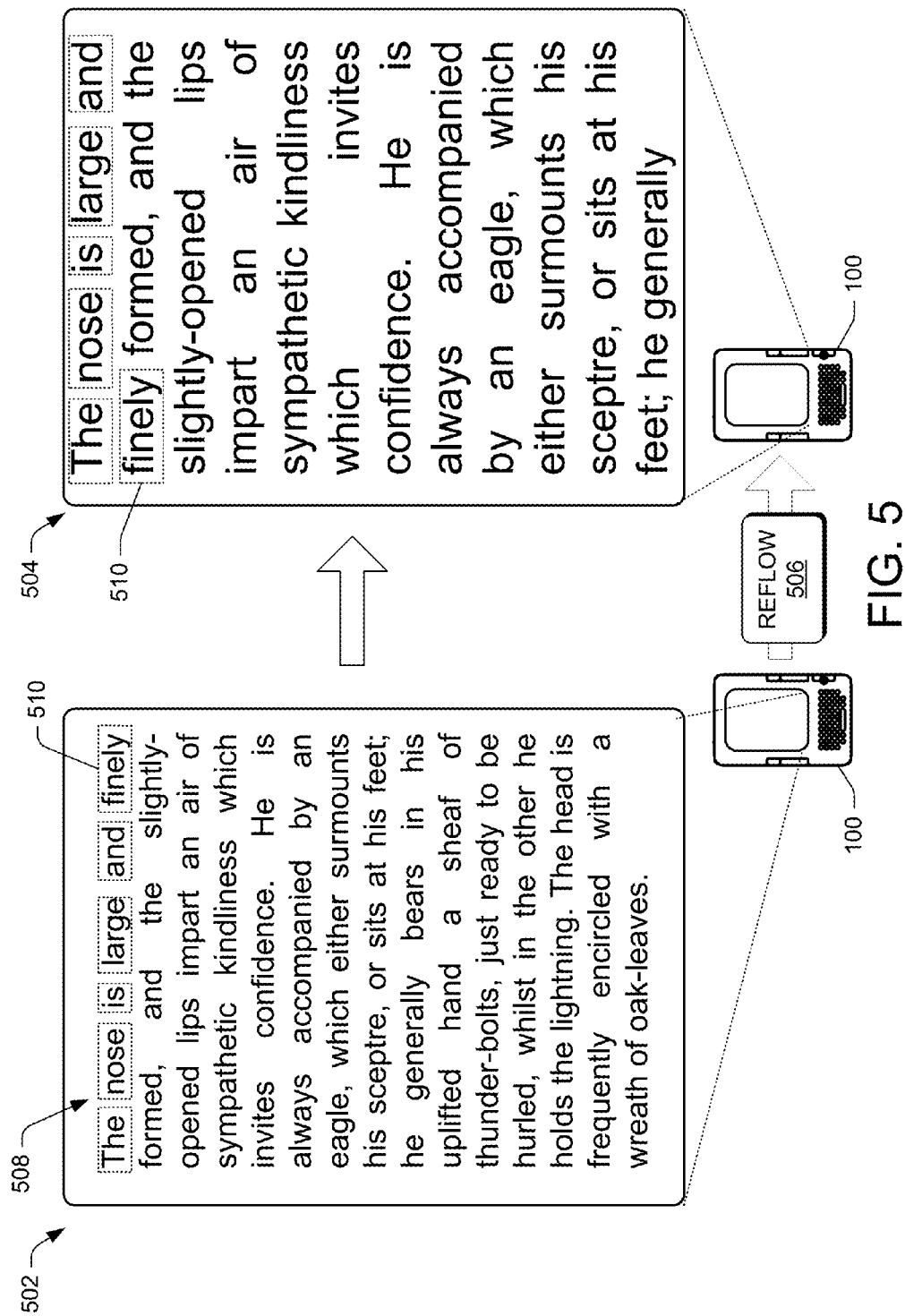
FIG. 5 is a schematic diagram showing illustrative zooming-in and reflowing of a selected column from an image-based document.

FIG. 5 is a schematic diagram showing illustrative zooming-in and reflowing of a selected column from an image-based document. As shown in FIG. 5, a column-viewing mode 502 shows the text of a column following a zooming-in operation performed by the zoom manager 116. Following a user command to zoom-in on the column again (from the column-viewing mode 502), such as to enlarge the text in the column to a particular size, the device 100 may present a resized column-viewing mode 504.

In some embodiments, the layout module 122 may perform a reflow operation 506 to reflow text in the column to maximize a display of text in a display space while keeping the text within a predefined area such that the user does not have to pan across the display space to view text of the column. The layout module 122 may perform the reflow process 506 by identifying blocks of text 508 (simply "blocks") in the text. The blocks 508 may be identified using limited use of OCR, such as to identify the blocks of characters but without determining the actual characters in the blocks. Next, the zoom manager 122 may enlarge the blocks 508 to a particular size based on a received zoom command from the user. The zoom manager 124 and/or the layout module 122 may then layout the enlarged blocks 508 in the resized column-viewing mode 504. In some instances, a block 510 may be pushed to a next line or a subsequent line when the layout module 122 lays out the text in the column following a zoom operation performed by the zoom module 124. Zooming-out operations may be performed using similar techniques.

In some embodiments, the reflow process 506 may be performed when objects are removed from within a column. For example, when the image 214 shown in FIG. 2 is removed during the subsequent layout of the text in the presentation 210 of the column-viewing mode, the layout module 122 and/or the zoom module 124 may reflow the text to maximize the blocks of text in the presentation.

Illustrative Operation

Figure 6:
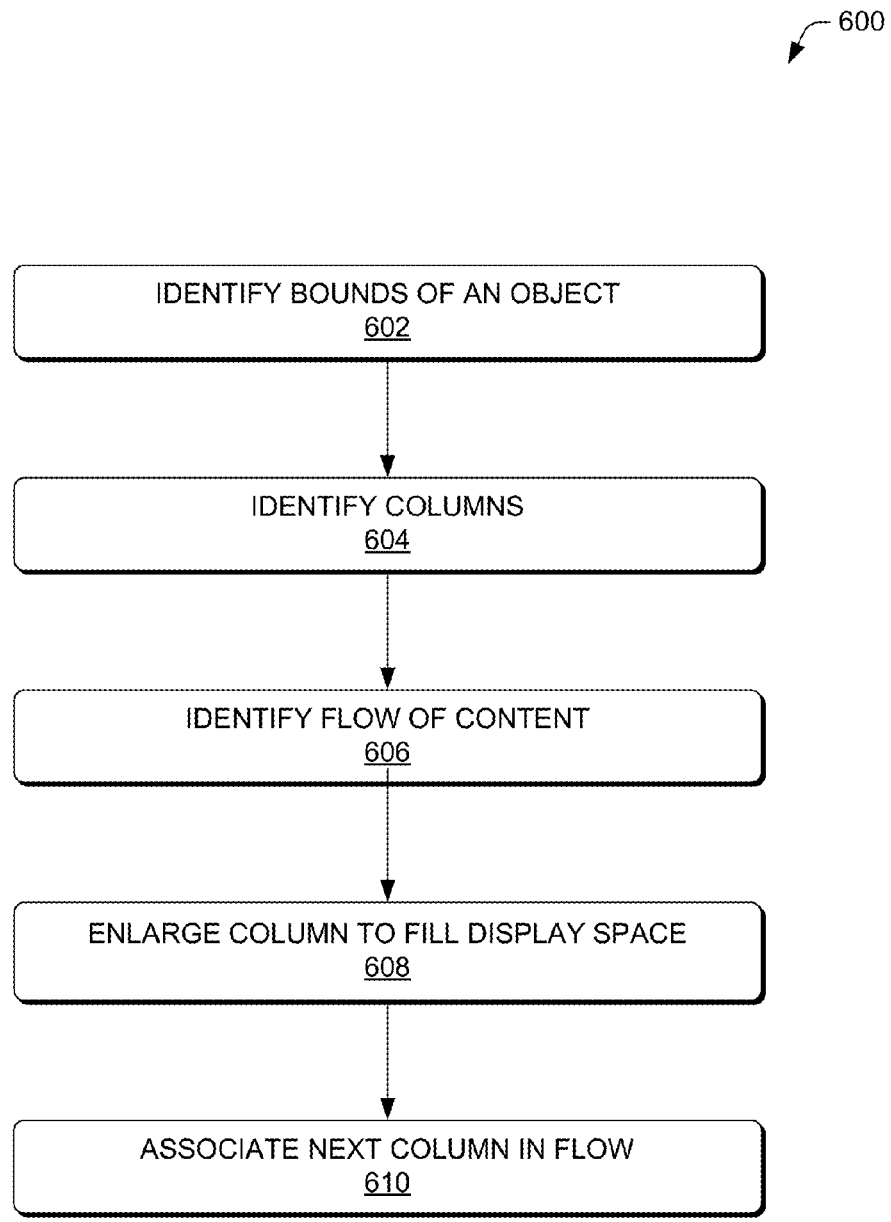
FIG. 6 is a flow diagram of an illustrative process to identify columns in the image-based document, order the columns, and enlarge a selected column to fill the display space as shown in FIG. 2.

FIG. 6 shows a flow diagram of an illustrative process 600 to identify columns in the image-based document, order the columns, and enlarge a selected column to fill the display space as shown in FIG. 2. The process 600 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure in FIGS. 7-9, in addition to process 600, shall be interpreted accordingly.

The operations shown in FIG. 6 may be performed by the zoom manager 116 or various modules associated with the zoom manager. The process 600 is described with reference to the preceding figures, and specifically to FIGS. 1 and 2.

At 602, the document analysis module 118 may identify bounds (borders) of an object using the processing paths. For example, the document analysis module 118 may perform processing paths as discussed above with respect to FIG. 3 and/or may identify the bounds (e.g., column rectangles) using the character-based column detection based on embedded text characters in the IBD 114. The bounds may include a width of the column, which may later be used to determine a zoom percentage when zooming-in on the column.

At 604, the document identifier 120 may categorize a detected object within the bounds identified by the processing paths as a column of text based at least in part on the information obtained by the document analysis module 118.

At 606, the layout module 122 may determine a flow of the columns. For example, the layout module 122 may use OCR to determine a language of the text, which may then be associated with a flow of the columns, such as left-to-right, right-to-left, and so forth.

At 608, the zoom module 124 may enlarge (zoom-in on) a selected column to fill a display space. The zoom module 124 may enlarge the content of the column to maintain a proportion ration of width and height, thus setting the width of the enlarged column to be substantially equivalent to a width of the display space, where any variation may be used for margins around the column. The zoom module 124 may then allow a user to scroll up/down within the column to show other portions of the column that may not be visible in the display space.

At 610, the zoom module 124 may associate a next column in the flow based on information from the layout module 122. For example, the zoom module 124 may present the next column in line with a current column (column currently zoomed-in on), when the user scrolls near the bottom of the current column. This may result in the columns of a multicolumn documents being presented by the zoom module 124 as a single continuous column.

In some embodiments, the zoom manager 116 may perform the functions of the process 600 without modifying the document, but instead presenting images of detected columns in a continuous series. This may enable the zoom manager 116 to quickly present a selected column as in the column-viewing mode, which is automatically enlarged to fill the display space without further operations by the user, such as zooming or panning of the document.

Figure 7:
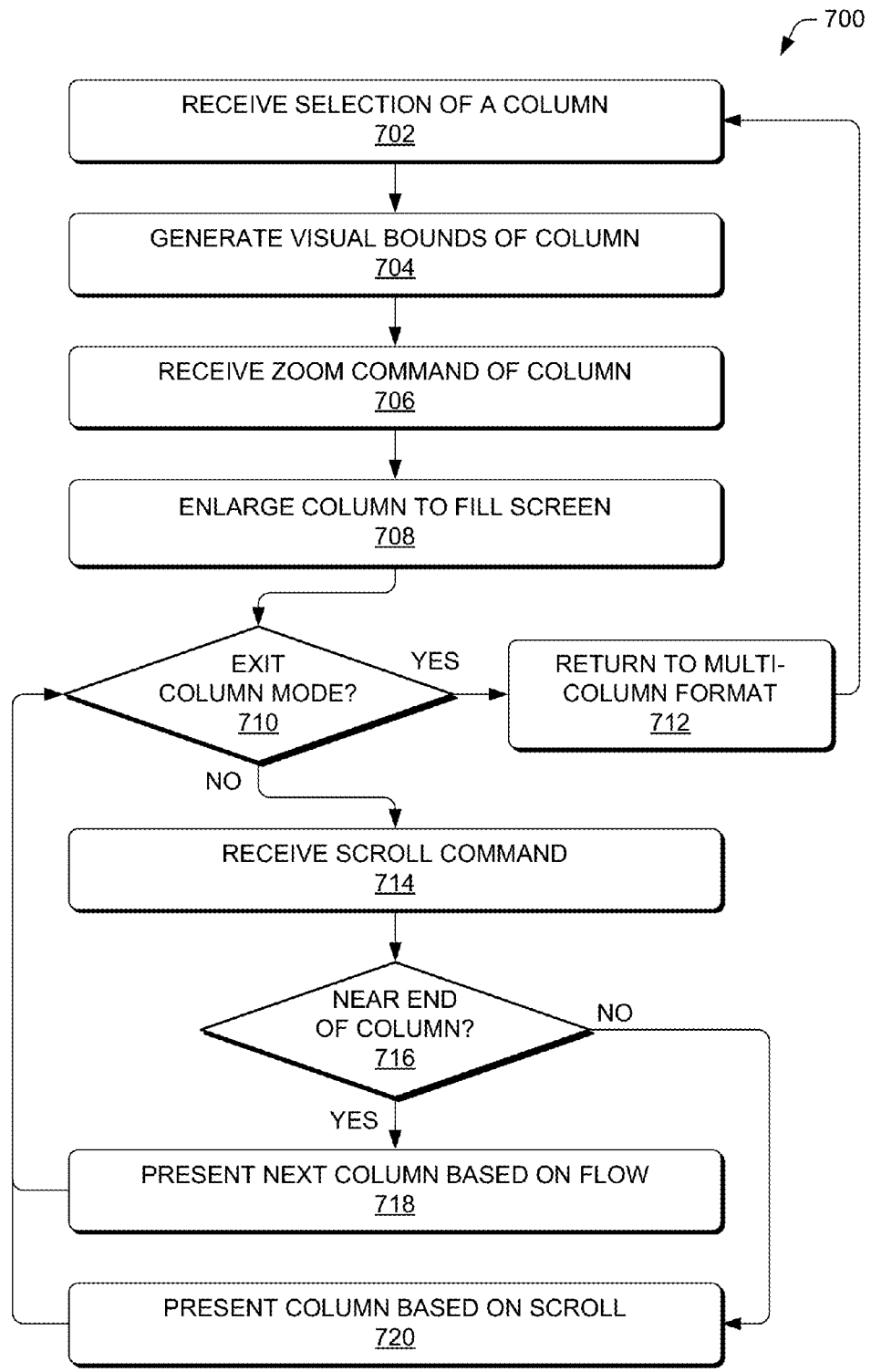
FIG. 7 is a flow diagram of an illustrative process to enable user interaction with the detected columns to enable zooming and continuous scrolling through the columns.

FIG. 7 shows a flow diagram of an illustrative process 700 to enable user interaction with the detected columns to enable zooming and continuous scrolling through the columns. The operations shown in FIG. 7 may be performed by the zoom manager 116 or various modules associated with the zoom manager. The process 700 is described with reference to the preceding figures, and specifically to FIGS. 1-2.

At 702, the zoom manager 116 may receive a user selection of a column in a multicolumn document (e.g., the IBD 114). For example, the zoom manager 116 may receive a user selection associated with a column in the document via a touch screen, where the user touches a part of the screen associated with the column. The zoom manager 116 may or may not have detected the presence of the column via the operation 602 prior to the received command.

At 704, the zoom manager 116 may generate visual bounds of the column associated with the user selection and identified in the operation 602. For example, the zoom manager 116 may highlight bounds of the column to indicate to the user that the column may be zoomed-in on with another subsequent selection of the column. However, the visual bounds do not have to be presented to the user in some embodiments.

At 706, the zoom manager 116 may receive a user command (e.g., the subsequent command) to zoom-in on the column. For example, the user may select the column by tapping on the column a second time, double tapping on the column, etc.

At 708, the zoom module 124 may enlarge the column to fill the display space in a column-viewing mode after receiving the selection at the operation 706. The operation 708 may be similar to the operation 608 discussed above.

At 710, the zoom module 124 may determine whether the exit the column-viewing mode (or zoomed-in state) by zooming out or likewise returning to a previous presentation of the IBD 114. When the zoom module 124 exits the column-viewing mode at 710 (via the "yes" route), the zoom module may reinstate or return to a multicolumn presentation of the IBD 114 at 712 and then continue processing at the operation 702 via a loop process. When the zoom module 124 does not exit the column-viewing mode at 710 (via the "no" route), the process may continue at 714.

At 714, the zoom module 124 may receive a scroll command to scroll through the zoomed-in column in the column-viewing mode. The scroll command may be activated by a button, dragging across a touch screen, and so forth.

At 716, the zoom module 124 may determine whether a presentation of the column in the display space is near the end (top/bottom) of a column. When the presentation of the column in the display space is near the end of the column, then the zoom module 124 may present a next column (or previous column in some instances) at 718 (via the "yes" route) at the end of the current column such that the columns appear continuous. This may enable the user to continuously scroll or otherwise navigate between columns without additional zooming or panning in the display space. When the presentation of the column in the display space is not near the end of the column, then the zoom module 124 may present the column at 720 (via the "no" route) based on the scroll command received at 714. Following either the operation 718 or the operation 720, the process 700 may return to the decision operation 710 and continue processing in a loop to allow user navigation of the IBD 114.

Figure 8:
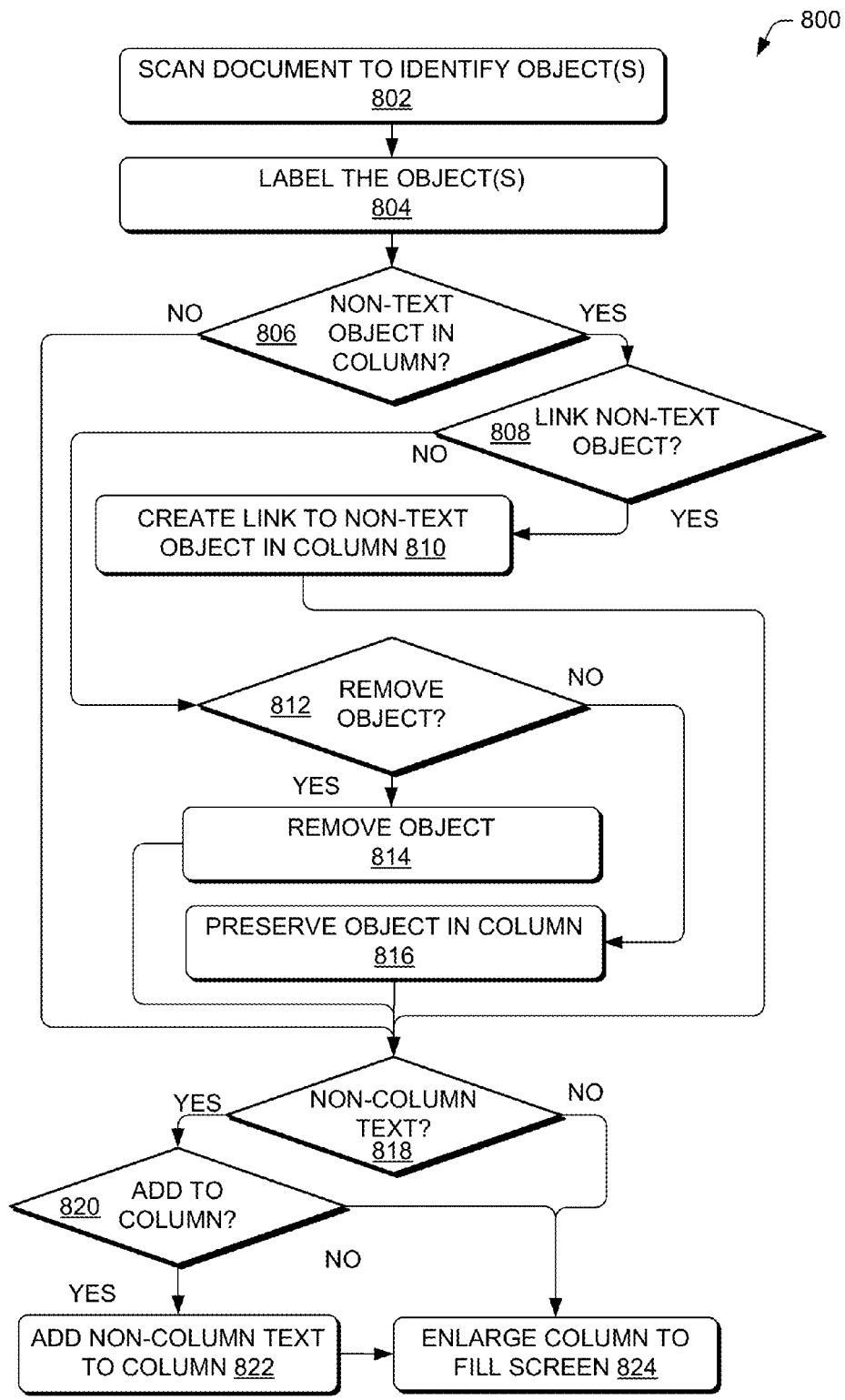
FIG. 8 is a flow diagram of an illustrative process to identify, categorize, and process non-text features in the column or text that is not in a column.

FIG. 8 shows a flow diagram of an illustrative process 800 to identify, categorize, and process non-text features in the column or text that is not in a column. The operations shown in FIG. 8 may be performed by the zoom manager 116 or various modules associated with the zoom manager. The process 800 is described with reference to the preceding figures, and specifically to FIGS. 1, 3 and 4.

At 802, the document analysis module 118 and the object identifier module 120 may cooperatively operate to scan the IBD 114 and identify objects. The objects may be identified using processing paths discussed with respect to FIG. 3 above, using pixel analysis, heuristics, inferences, and/or other techniques discussed above.

At 804, the object identifier module 120 may label or categorize the objects. The categories may include a column of text, an image, a header, a footer, and/or other categories.

At 806, the layout module 122 may determine whether non-text objects are included in a column. When non-text objects are included a column, the layout module 122 may determine whether to link the non-text objects at 808. From the decision 808 (via the "yes" route), the layout module 122 may create a link to the non-text object in the column. The link may be a hyper link, symbol, smaller version of the object, or other type of navigation link that, when selected, directs the user to the object associated with the link. For example, the object may be an image in the column. When laying out the column for the column-viewing mode, image may be represented as a link while possibly omitting the full image. When the user selects the link, the column-viewing mode may show the image over the column of text or instead of the column of text. In some embodiments, the image (or other object) may be shown in size that fills or substantially fills the display space.

When the layout module 122 does not link the object at the decision operation 808 (via the "no" route), the layout module may determine whether to remove the feature in the column-viewing mode at 812. When the layout module 122 determines to remove the object (via the "yes" route), then the object may be removed at 814. Alternatively (via the "no" route), the layout module 122 may preserve the object in the column when in the column mode-viewing at 816.

Following any of the operations 810, 814, or 816, the layout module 122 may determine whether non-column text is included in the objects at 818. The non-column text may include headers, footers, page numbers, and so forth. In some instances, some of this information may be inserted in the column in the column-viewing mode to enable the user to view the non-column text with the text in the column (i.e., column text).

When the layout module 122 determines that non-column text is present, the layout module may determine whether to add the non-column text to the column text at 820. The non-column text is added to the column text (via the "yes" route) at 822. When the non-text column text is not present or not added to the column text (via the "no" route from the decision operations 818 or 820, respectively, or following the addition of the non-column text at the operation 822, the zoom module may enlarge the column to fill the display space at 824, which may be similar to the operation 608 discussed above.

Figure 9:
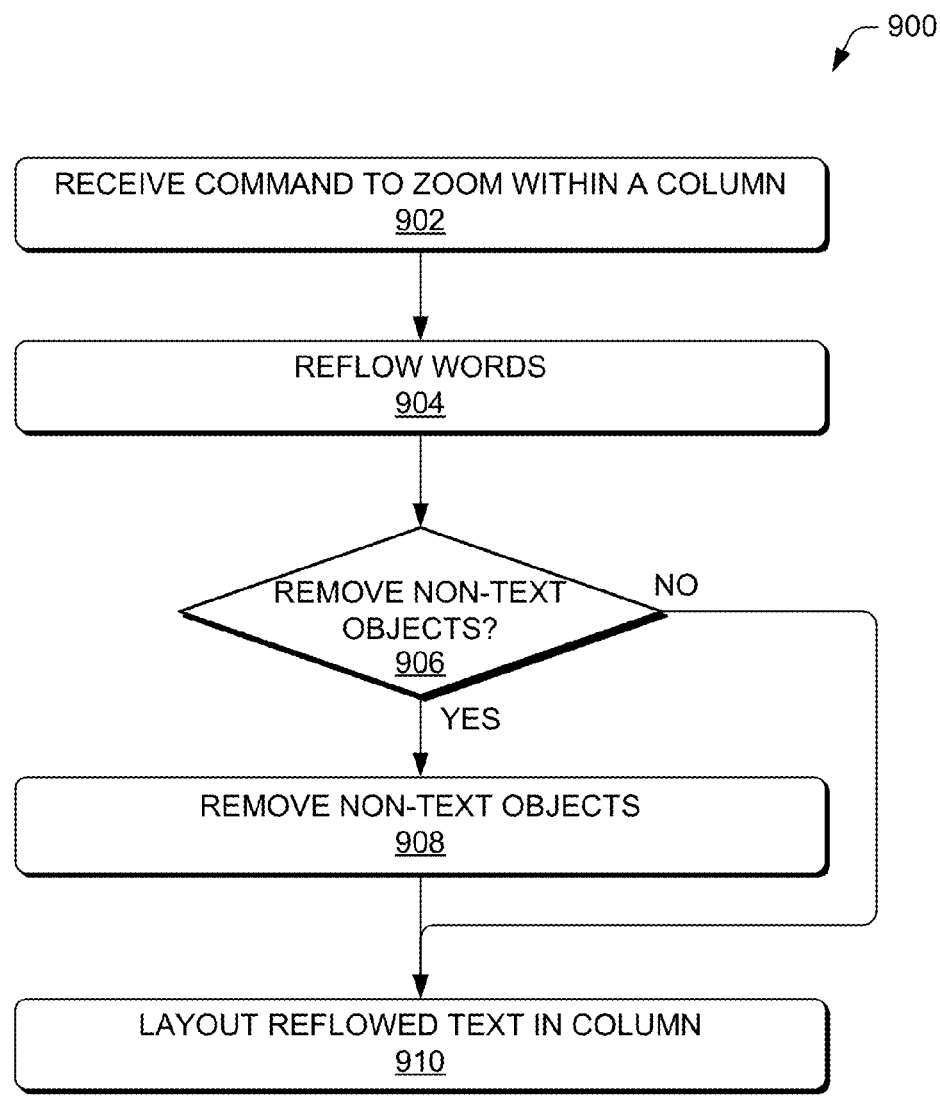
FIG. 9 is a flow diagram of an illustrative process to reflow text to enable zooming within an enlarged column view as shown in FIG. 5.

FIG. 9 shows a flow diagram of an illustrative process 900 to reflow text to enable zooming within an enlarged column-viewing mode as shown in FIG. 5. The operations shown in FIG. 9 may be performed by the zoom manager 116 or various modules associated with the zoom manager. The process 900 is described with reference to the preceding figures, and specifically to FIGS. 1 and 5.

At 902, the zoom manager 116 may receive a user command to zoom within a column of the IBD 114. For example, the zoom manager 116 may receive a selection from a user via a touch screen to select a column for zooming-in, where the user touches a part of the screen associated with the selected column.

At 904, the layout module 122 may reflow the words in the column to accommodate a zooming of the text in the column-viewing mode as shown and discussed with reference to FIG. 5.

At 906, the layout module 122 may determine whether to remove non-text objects from the column when the column is presented in a zoomed-in presentation. When the layout module 122 determines to remove the objects at the decision operation 906 (via the "yes" route), then the layout module may remove the non-text objects at 908. When the layout module 122 determine not to remove the non-text objects (via the "no" route from the decision operation 906), or following the operation 908, the layout module 122 may layout the reflowed text in the column at 910 for presentation by the zoom module 124.

In some embodiments, the process 900 may also determine whether to provide links for the objects in the columns, which may either replace the object or be used to select the object and zoom-in on the object to fill the display space, as discussed in the process 800.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   determining for an image-based document, by at least one of one or more computing systems, a color value of each pixel of a plurality of pixels;
   associating, by at least one of the one or more computing systems, a dominant color value to content within the image-based document, the content comprising at least text having a text color value within a predetermined deviation of the dominant color value;
   identifying, by at least one of the one or more computing systems, an image within the image-based document, the image comprising a group of pixels having a color value within the predetermined deviation of the dominant color value;
   determining, a layout of the text by identifying bounds of columns in a multicolumn presentation of the text within the image-based document, the determining based at least in part on the dominant color value;

determining, by at least one of the one or more computing systems, a flow of the text between the columns by performing character recognition on a portion of the text in the columns;

ordering, by at least one of the one or more computing systems, the columns based at least in part on the determined flow of the text;

receiving, by at least one of the one or more computing systems, a zoom-in command associated with a selected column;

zooming-in, by at least one of the one or more computing systems, on the selected column to initiate a column-viewing mode to enlarge the selected column such that the bounds of the selected column are enlarged to approximately span a width of a display space; and presenting, by at least one of the one or more computing systems, another column in line with the selected column based at least in part on the ordering of the columns to enable continuous scrolling through the columns in the column-viewing mode.

2. The method as recited in claim 1, further comprising:

detecting, by at least one of the one or more computing systems, a non-text object within the selected column; and removing, by at least one of the one or more computing systems, the non-text object prior to zooming-in on the selected column in the column-viewing mode.

3. The method as recited in claim 1, further comprising:

detecting, by at least one of the one or more computing systems, a non-text object within the selected column; and replacing, by at least one of the one or more computing systems, the non-text object in the column-viewing mode with a link that, when selected in the column-viewing mode, zooms in on the associated non-text object.

4. The method as recited in claim 1, further comprising:

detecting, by at least one of the one or more computing systems, a non-column object in the image-based document that is not associated with the column; and inserting, by at least one of the one or more computing systems, the non-column object in the selected column in the column-viewing mode.

5. The method as recited in claim 1, wherein performing the character recognition on the portion of the text in the columns further comprises grouping the characters into words by detecting white-spaces between characters of the portion of the text.

6. The method as recited in claim 1, wherein the predetermined deviation is based on a predetermined percentage hue deviation.

7. The method as recited in claim 1, further comprising:

in response to determining that the color value of a pixel is not within the predetermined deviation of the dominant color value;

determining whether at least a predetermined percentage of other pixels adjacent to the pixel have different color values than the color value of the pixel;

in response to determining that at least the predetermined percentage of the other pixels have different color values than the color value of the pixel, associating the pixel with an artifact of the image-based document; and removing the artifact from the image-based document.

8. The method as recited in claim 1, wherein the character recognition on the portion of the text further determines a language of the text; and wherein the ordering the columns is further based at least in part on the language of the text.

9. The method as recited in claim 1, wherein the identifying is further based at least in part on a shape of the group of pixels or the group of pixels including a number of pixels that exceed a predetermined threshold.

10. A method comprising:

determining for an image-based document, by at least one of one or more computing systems, a color value of each pixel of a plurality of pixels;

associating, by at least one of the one or more computing systems, a dominant color value to content within the image-based document, the content comprising at least text having a text color value within a predetermined deviation of the dominant color value;

identifying, by at least one of the one or more computing systems, an image within the image-based document, the image comprising a group of pixels having a color value within the predetermined deviation of the dominant color value;

determining, a layout of the text by identifying bounds of objects in a multicolumn presentation of the text within the image-based document, the determining based at least in part on the dominant color value;

analyzing, by at least one of the one or more computing systems, the objects to classify at least a portion of the objects as columns;

ordering, by at least one of the one or more computing systems, the columns based at least in part on the layout of the text;

receiving, by at least one of the one or more computing systems, a selection of one of the columns as a selected column; and zooming-in, by at least one of the one or more computing systems, on the selected column to initiate a column-viewing mode to enlarge the selected column such that the bounds of the selected column are enlarged to approximately span a width of a display space.

11. The method as recited in claim 10, further comprising, presenting, by at least one of the one or more computing systems, another column before or after the selected column based at least in part on the ordering of the columns to enable continuous scrolling through the columns in the column-viewing mode.

12. The method as recited in claim 11, wherein the ordering of the columns based at least in part on sampling, by at least one of the one or more computing systems, a portion of the text using character recognition.

13. The method as recited in claim 10, further comprising zooming-in within the column-viewing mode, by at least one of the one or more computing systems, to enlarge a font of the text in the selected column while maintaining a width of the column in the column-viewing mode.

14. The method as recited in claim 13, further comprising reflowing the text, by at least one of the one or more computing systems, in the selected column prior to zooming-in within the column-viewing mode to move blocks of the text to other lines within the selected column.

15. The method as recited in claim 10, further comprising receiving, by at least one of the one or more computing systems, a selection from a user via a touch screen to initiate the zooming-in.

16. The method as recited in claim 10, wherein the image-based document is a portable format document (PDF) document.

17. The method as recited in claim 10, further comprising generating, by at least one of the one or more computing systems, a border around the selected column prior to the zooming-in on the selected column.

18. One or more non-transitory computer-readable storage media storing computer-executable instructions that, when executed on one or more processors, performs acts comprising:
   determining for an image-based document, a color value of each pixel of a plurality of pixels, the image-based document comprising multiple columns of text;
   associating a dominant color value to content within the image-based document, the content comprising at least text having a text color value within a predetermined deviation of the dominant color value;
   identifying an image within the image-based document, the image comprising a group of pixels having a color value within the predetermined deviation of the dominant color value;
   determining, bounds of individual columns of the multiple columns of text, the determining based at least in part on the dominant color value;
   ordering the individual columns of the text based at least in part on the determined bounds of the individual columns;
   receiving a selection within an area of one of the bounds; and
   in response to the selection, zooming-in on a selected column of the text associated with the bounds to enlarge the selected column of the text to approximately fill a display space.

19. The one or more non-transitory computer-readable media as recited in claim 18, further comprising:
   receiving another selection associated with the selected column of the text; and
   zooming-out of the selected column of the text and back to a multicolumn view of the image-based document in response to the other selection associated with the selected column of the text.

20. The one or more non-transitory computer-readable media as recited in claim 19, wherein the zooming-in further includes centering the selected column of the text horizontally within the display space.

21. A system comprising:
   one or more processors; and
   memory, accessible by the one or more processors;
   a document analysis module, stored in the memory and executable on the one or more processors, to:
      determine for an image-based document, a color value for each pixel of a plurality of pixels;
      determine a dominant color value associated with objects in the image-based document, the objects having an object color value within a predetermined deviation of the dominant color value;
      identify bounds of the objects in the image-based document based at least in part on the dominant color value;
   an object identifier module, stored in the memory and executable on the one or more processors, to label objects within the bounds as one of a text or an image, the image comprising a group of pixels having a color value within the predetermined deviation of the dominant color value;
   a layout module, stored in the memory and executable on the one or more processors, to determine a flow of the text between the multiple columns of the text based at least in part on a layout of the text; and
   a zoom module, stored in the memory and executable on the one or more processors, to zoom-in on a selected column of the text to enlarge bounds of the selected column of the text to approximately fill a display space.

22. The system as recited in claim 21, wherein the layout module is to further reflow the text in the selected column to remove an image prior to the zooming-in on the selected column by the zoom module.

23. The system as recited in claim 21, wherein the layout module is to further add a link to an object in the selected column prior to the zooming-in on the selected column by the zoom module.

24. The system as recited in claim 21, wherein the layout module is to further determine a header or a footer for the selected column, and in response to the zoom module zooming-in on the selected column, the zooming-in module to selectively maintain the header or the footer in a column-viewing mode of the selected column during a continuous scrolling operation.

25. The system as recited in claim 21, wherein the object identifier module further labels objects within the bounds as at least one of an image, a header, or a footer.

* * * * *